(12) United States Patent
Stanjek et al.

(10) Patent No.: US 10,113,092 B2
(45) Date of Patent: Oct. 30, 2018

(54) MULTICOMPONENT CROSSLINKABLE COMPOSITIONS BASED ON ORGANYLOXYSILANE-TERMINATED POLYMERS

(71) Applicant: Wacker Chemie AG, Munich (DE)

(72) Inventors: Volker Stanjek, Ampfing (DE); Bernd-Josef Bachmeier, Haiming (DE); Lars Zander, Altoetting (DE)

(73) Assignee: WACKER CHEMIE AG, Munich (DE)

( * ) Notice: Subject to any disclaimer, the term of this patent is extended or adjusted under 35 U.S.C. 154(b) by 502 days.

(21) Appl. No.: 14/417,959

(22) PCT Filed: Aug. 8, 2013

(86) PCT No.: PCT/EP2013/066627
§ 371 (c)(1),
(2) Date: Jan. 28, 2015

(87) PCT Pub. No.: WO2014/026906
PCT Pub. Date: Feb. 20, 2014

(65) Prior Publication Data
US 2015/0203729 A1    Jul. 23, 2015

(30) Foreign Application Priority Data
Aug. 14, 2012 (DE) .................. 10 2012 214 427

(51) Int. Cl.
| | |
|---|---|
| C09J 183/04 | (2006.01) |
| B32B 37/12 | (2006.01) |
| C08G 65/336 | (2006.01) |
| C08G 77/04 | (2006.01) |
| C08L 83/04 | (2006.01) |
| C09D 183/04 | (2006.01) |
| B32B 37/18 | (2006.01) |
| C09K 3/10 | (2006.01) |
| C08L 101/10 | (2006.01) |

(52) U.S. Cl.
CPC ......... *C09J 183/04* (2013.01); *B32B 37/1284* (2013.01); *B32B 37/18* (2013.01); *C08G 65/336* (2013.01); *C08G 77/045* (2013.01); *C08L 83/04* (2013.01); *C08L 101/10* (2013.01); *C09D 183/04* (2013.01); *C09K 3/1018* (2013.01); *B32B 2037/1246* (2013.01)

(58) Field of Classification Search
CPC ....... C09J 183/04; C08G 65/336; C08L 83/04
See application file for complete search history.

(56) References Cited

U.S. PATENT DOCUMENTS

| | | |
|---|---|---|
| 6,884,852 B1 | 4/2005 | Klauck et al. |
| 7,319,128 B2 | 1/2008 | Ziche et al. |
| 8,101,704 B2 | 1/2012 | Baumann et al. |
| 2005/0227093 A1 | 10/2005 | Nixon |
| 2006/0020097 A1* | 1/2006 | Briehn .................. C08G 77/38 528/25 |
| 2007/0129528 A1* | 6/2007 | Huang .................. C08G 18/10 528/78 |
| 2007/0167598 A1 | 7/2007 | Stanjek et al. |
| 2008/0113162 A1* | 5/2008 | Barthel ................. B01J 20/103 428/195.1 |
| 2009/0156737 A1 | 6/2009 | Schindler et al. |
| 2011/0248211 A1 | 10/2011 | Matsumoto et al. |
| 2012/0107626 A1 | 5/2012 | Schindler et al. |
| 2012/0165493 A1 | 6/2012 | Stanjek et al. |

FOREIGN PATENT DOCUMENTS

| | | | |
|---|---|---|---|
| CN | 101443417 A | 5/2009 | |
| CN | 101875786 A | 11/2010 | |
| CN | 102220181 A | 10/2011 | |
| DE | 10 2009 027 357 A1 | 1/2011 | |
| DE | 102009027357 A1 | 1/2011 | |
| DE | 102009027357 * | 5/2011 | ............ C09J 201/10 |
| EP | 1093482 B1 | 4/2001 | |
| EP | 1535940 B1 | 6/2005 | |
| EP | 1641854 B1 | 4/2006 | |
| EP | 1896523 B1 | 3/2008 | |
| WO | 2011026658 A1 | 3/2011 | |

* cited by examiner

*Primary Examiner* — Ling Siu Choi
*Assistant Examiner* — Thuy-Ai N Nguyen
(74) *Attorney, Agent, or Firm* — Brooks Kushman P.C.

(57) ABSTRACT

Multicomponent crosslinkable compositions based on organyloxysilane-terminated polymers free of toxicologically objectionable catalysts and isocyanates exhibiting good tensile shear strength are useful for adhesive bonding and sealing of substrates.

20 Claims, No Drawings

MULTICOMPONENT CROSSLINKABLE COMPOSITIONS BASED ON ORGANYLOXYSILANE-TERMINATED POLYMERS

CROSS-REFERENCE TO RELATED APPLICATIONS

This application is the U.S. National Phase of PCT Appln. No. PCT/EP2013/066627 filed Aug. 8, 2013, which claims priority to German Application No. 10 2012 214 427.7 filed Aug. 14, 2012, the disclosures of which are incorporated in their entirety by reference herein.

BACKGROUND OF THE INVENTION

1. Field of the Invention

The invention relates to multicomponent crosslinkable compositions based on silane-crosslinking prepolymers and silicone resins, methods for producing them, and their use as adhesives and sealants, more particularly as adhesives with high tensile shear strength.

2. Description of the Related Art

For adhesive bonds of high tensile shear strength, of the kind employed for numerous wood bonds among others, typically, isocyanate-crosslinking PU adhesives are employed. These PU adhesives usually comprise aromatic polyisocyanates. Systems of this kind cure by reaction of the isocyanate groups with (atmospheric) moisture. Since PU adhesives cure via a chemical crosslinking reaction and are also able to attach chemically to a wood substrate, they exhibit very good mechanical properties and are also comparatively resistant toward external (weathering) effects such as moisture or direct water contact.

The general performance of adhesives is ascertained by their compliance with standards, such as, for example, DIN EN 204, durability class D1-D4. These standards can generally be met by isocyanate-crosslinking adhesives.

Nevertheless, even isocyanate-crosslinking adhesives possess disadvantages inherent in the system such as for example, health-related classification which ranges from sensitizing to toxic. A critical factor is the amount of monomeric isocyanates which remain, and which are removable only with difficulty. This presents problems for the end user, i.e., the craftworker or home improver who comes into contact not only with the fully cured and hence isocyanate-free and entirely unobjectionable product, but also with the isocyanate-containing adhesive or monomeric isocyanates. For the unpracticed home improver there is a particular risk that the products may not be used expertly and/or properly. Additional hazards arise from incorrect storage such as storage within the reach of children. With the professional craftworker, on the other hand, proper use and storage can be assumed. However, a potential problem exists that the professional user is required very regularly—possibly even a number of times a day—to work with the isocyanate-containing material, which is potentially critical in view of the aforementioned sensitizing and also because of possibly carcinogenic effects of isocyanates.

Somewhat more favorable in this respect are isocyanate-crosslinking adhesives which contain only very low levels of volatile monomeric isocyanates and are therefore at least free from labeling requirements. These adhesives too, however, usually contain high concentrations of various oligomeric isocyanates.

An alternative curing technology which is being increasingly applied in the adhesives sector is silane crosslinking where alkoxysilane-functional prepolymers initially undergo hydrolysis on contact with atmospheric moisture and then cure through a condensation reaction. The corresponding silane—functional—usually silane-terminated—prepolymers are entirely unobjectionable from a toxicological standpoint.

Polymer systems which possess reactive alkoxysilyl groups have been known for a long time. On contact with water or atmospheric moisture, these alkoxysilane-terminated polymers are capable of undergoing condensation with one another even at room temperature with elimination of the alkoxy groups. Thus, adhesives based on alkoxysilane-crosslinking polymers exhibit not only good properties of adhesion to the majority of substrates in their fully cured state, but also very good mechanical properties. The adhesives exhibit not only high elasticity but also a tensile strength which is entirely sufficient for many applications.

But a disadvantage of many systems in line with the prior art is the low reactivity of the corresponding MS polymers or SPUR polymers with respect to moisture, necessitating an aggressive catalysis. Therefore, the mixtures in question typically include considerable amounts of toxicologically objectionable tin catalysts.

An advantage is the use of α-silane-terminated prepolymers, which possess reactive alkoxysilyl groups joined via a methylene spacer to an adjacent urethane unit. This class of compounds is highly reactive and requires neither tin catalysts nor strong acids or bases to achieve high cure rates in contact with air.

Another disadvantage of the majority of common silane-crosslinking systems is a relatively low tensile shear strength. Typical applications for this new type of adhesive are confined, consequently, in general to areas in which the requirement is for elastic adhesives more than for adhesives of high tensile strength.

Adhesives with tensile shear strengths >6 MPa, more particularly adhesives with tensile shear strengths >9 MPa, have to this date been producible only using certain highly specific silane-crosslinking systems, inter alia with silane-terminated polyurethanes, of the kind described for example in WO 2011/026658 and its US equivalent US 2012/165493, disclosures of which are incorporated in their entirety by reference herein. The high tensile shear strength is achieved through the use of prepolymers which on the one hand have a very high density of urea units and/or urethane units that are capable of hydrogen bonding and on the other hand are relatively short-chained and thus have a correspondingly high number of crosslinkable silane end groups. Systems of this kind, however, inevitably possess two inherent disadvantages. First, the preparation of prepolymers with a high concentration of silane-crosslinking groups necessitates correspondingly large quantities of silane. These silanes, however, generally constitute the most cost-intensive prepolymer constituents. Secondly, the high concentration of urethane groups and/or urea groups, which is likewise necessary for achieving high tensile shear strengths, leads to very high prepolymer viscosities. Correspondingly problematic are the compounding of these prepolymers to form fully formulated adhesives and the application of these end products, which usually likewise have comparatively high viscosity.

SUMMARY OF THE INVENTION

It has now been unexpectedly and surprisingly discovered that multicomponent crosslinkable compositions based on organyloxysilane-terminated polymers free of toxicologically objectionable catalysts and isocyanates exhibit good tensile shear strength and are useful as adhesives.

DESCRIPTION OF THE PREFERRED EMBODIMENTS

The invention provides multicomponent crosslinkable compositions (K) comprising at least a component (K1) and a component (K2), wherein the component (K1) comprises 100 parts by weight of compounds (A) of the formula $$Y-[(CR^1_2)_b-SiR_a(OR^2)_{3-a}]_x \quad (I),$$

where
Y represents an x-valent polymer radical bonded via nitrogen, oxygen, sulfur, or carbon,
R represents an identical or different monovalent, optionally substituted, SiC-bonded hydrocarbon radical,
$R^1$ represents identical or different hydrogen atom or a monovalent, optionally substituted hydrocarbon radical, which may be attached to the carbon atom via nitrogen, phosphorus, oxygen, sulfur, or carbonyl group,
$R^2$ represents identical or different hydrogen atom or a monovalent, optionally substituted hydrocarbon radical,
x is an integer from 1 to 10, preferably 1, 2, or 3, more preferably 1 or 2,
a may be identical or different and is 0, 1, or 2, preferably 0 or 1,
b may be identical or different and is an integer from 1 to 10, preferably 1, 3, or 4, more preferably 1 or 3, most preferably 1, and
the component (K2), based in each case on 100 parts by weight of compounds (A) in the component (K1), at least 0.05 part by weight of water, and at least 1 part by weight of at least one further substance selected from
(B) silicone resins comprising units of the formula $$R^3_c(R^4O)_d SiO_{(4-c-d)/2} \quad (II),$$

where
$R^3$ represents identical or different hydrogen atom or a monovalent, SiC-bonded, optionally substituted hydrocarbon radical,
$R^4$ represents identical or different hydrogen atom or a monovalent, optionally substituted hydrocarbon radical,
c is 0, 1, 2, or 3, and
d is 0, 1, 2, or 3, preferably 0, 1, or 2, more preferably 0 or 1,
where the sum of c+d is less than or equal to 3 and in at least 50%, preferably at least 60%, of the units of the formula (II) c is 0 or 1,
(C) plasticizers,
(D) fillers,
(E) thickeners, and
(F) solvents,
with the proviso that in total, there are at least 10 parts by weight of silicone resins (B) in components (K1) and (K2), based on 100 parts by weight of compounds (A) in component (K1).

The compositions (K) are preferably two-component compositions consisting of components (K1) and (K2).

Components (K1) and (K2) of the compositions (K) are preferably kept separately during storage and not mixed with one another until shortly before or even during the application of the composition (K).

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals such as the n-hexyl radical; heptyl radicals such as the n-heptyl radical; octyl radicals such as the n-octyl radical, isooctyl radicals, and the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radical, and methylcyclohexyl radicals; alkenyl radicals such as the vinyl, 1-propenyl, and the 2-propenyl radical; aryl radicals such as the phenyl, naphthyl, anthryl, and phenanthryl radical; alkaryl radicals such as o-, m-, p-tolyl radicals; xylyl radicals and ethylphenyl radicals; and aralkyl radicals such as the benzyl radical, the α- and the β-phenylethyl radical.

Examples of substituted radicals R are haloalkyl radicals and haloaryl radicals such as the o—, m—, and p-chlorophenyl radical.

Radical R preferably comprises monovalent hydrocarbon radicals which are optionally substituted by halogen atoms and which have 1 to 6 carbon atoms, more preferably alkyl radicals having 1 or 2 carbon atoms, most preferably the methyl radical.

Examples of radicals $R^1$ are hydrogen atom, the radicals specified for R, and also optionally substituted hydrocarbon radicals bonded to the carbon atom via nitrogen, phosphorus, oxygen, sulfur, carbon, or carbonyl group. Preferably, $R^1$ is hydrogen atom and hydrocarbon radicals having 1 to 20 carbon atoms, most preferably hydrogen atom.

Examples of radical $R^2$ are hydrogen atom or the examples specified for radical R. Radical $R^2$ is preferably hydrogen atom or alkyl radicals which are optionally substituted by halogen atoms and which have 1 to 10 carbon atoms, more preferably alkyl radicals having 1 to 4 carbon atoms, most preferably the methyl and ethyl radical.

Polymer radical Y preferably comprises organic polymer radicals which as a polymer chain comprise polyoxyalkylenes such as polyoxyethylene, polyoxypropylene, polyoxybutylene, polyoxytetramethylene, polyoxyethylene-polyoxypropylene copolymer, and polyoxypropylene-polyoxybutylene copolymer; hydrocarbon polymers such as polyisobutylene, polyethylene, or polypropylene, and copolymers of polyisobutylene with isoprene; polyisoprenes; polyurethanes; polyesters, polyamides; polyacrylates; polymetacrylates; and polycarbonates, and which are bonded preferably via —O—C(=O)—NH—, —NH—C(=O)O—, —NH—C(=O)—NH—, —NR'—C(=O)—NH—, NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, and —NR'— to the group or groups —[(CR$^1_2$)$_b$—SiR$_a$(OR$^2$)$_{3-a}$], where R' may be identical or different and has a definition specified for R or is a group —CH(COOR")—CH$_2$—COOR" in which R" may be identical or different and has a definition specified for R.

Examples of radicals R' are cyclohexyl, cyclopentyl, n-propyl and isopropyl, n-butyl, isobutyl, and tert-butyl radicals, the various stereoisomers of the pentyl radical, hexyl radical, or heptyl radical, and also the phenyl radical.

Radical R' is preferably a group —CH(COOR")—CH$_2$—COOR" or an optionally substituted hydrocarbon radical having 1 to 20 carbon atoms, more preferably a linear, branched or cyclic alkyl group having 1 to 20 carbon atoms, or an aryl group which has 6 to 20 carbon atoms and is optionally substituted by halogen atoms.

The radicals R" are preferably alkyl groups having 1 to 10 carbon atoms, more preferably methyl, ethyl, or propyl radicals.

More preferably, radical Y in formula (I) comprises polyurethane radicals and polyoxyalkylene radicals, most preferably polyoxypropylene-containing polyurethane radicals or polyoxypropylene radicals.

The compound (A) may have the groups —[(CR$^1$$_2$)$_b$—SiR$_a$(OR$^2$)$_{3-a}$], attached in the manner described, at any desired locations within the polymer such as within the chain and/or terminally, preferably within the chain and terminally, most preferably terminally.

Where Y stands for polyurethane radicals, the radicals in question are preferably those whose chain ends are bonded via —NH—C(=O)O—, —NH—C(=O)—NH—, —NR'—C(=O)—NH—, or —NH—C(=O)—NR'—, more preferably via —O—C(=O)—NH— or —NH—C(=O)—NR'— to the group or groups —[(CR$^1$$_2$)$_b$—SiR$_a$(OR$^2$)$_{3-a}$], with all of the radicals and indices having one of the definitions given above. The polyurethane radicals Y are preparable preferably from linear or branched polyoxyalkylenes, more preferably from polypropylene glycols, and from di- or polyisocyanates. The radicals Y preferably have number-average molar masses M$_n$ of 10,000 to 30,000 g/mol, more preferably of 11,000 to 20,000 g/mol. Suitable processes for preparing corresponding compounds (A), and also examples of the compounds (A) themselves, are described in publications including EP 1 093 482 B1 (paragraphs [0014]-[0023], [0039]-[0055] and also inventive example 1 and comparative example 1) and its US equivalent U.S. Pat. No. 6,884,852; and EP 1 641 854 B1 (paragraphs [0014]-[0035], inventive examples 4 and 6, and comparative examples 1 and 2) and its US equivalent US 2007/167598, disclosures of which are incorporated in their entirety by reference herein.

Where Y stands for polyoxyalkylene radicals, the radicals in question are preferably linear or branched polyoxyalkylene radicals, more preferably polyoxypropylene radicals, whose chain ends are bonded preferably via —O—C(=O)—NH— to the group or groups —[(CR$^1$$_2$)$_b$—SiR$_a$(OR$^2$)$_{3-a}$]. The polyoxyalkylene radicals Y preferably have number-average molar masses M$_n$ of 10,000 to 30,000 g/mol, more preferably of 11,000 to 20,000 g/mol. Suitable processes for preparing the corresponding compounds (A) and also examples of the compounds (A) themselves are described in publications including EP 1 535 940 B1 (paragraphs [0005]-[0025] and also inventive examples 1-3 and comparative examples 1-4) and its US equivalent U.S. Pat. No. 7,319,128, and EP 1 896 523 B1 (paragraphs [0008]-[0047]) and its US equivalent U.S. Pat. No. 8,101,704, disclosures of which are incorporated in their entirety by reference herein.

The number-average molar mass M$_n$ can be determined by Size Exclusion Chromatography (SEC) against polystyrene standard, in THF, at 60° C., a 1.2 ml/min flow rate, and detection by RI (refractive index detector) on a Styragel HR3-HR4-HR5-HR5 column set from Waters Corp., USA, with an injection volume of 100 μl.

The end groups of the compounds (A) are preferably groups of the general formulae

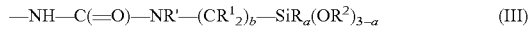

—NH—C(=O)—NR'—(CR$^1$$_2$)$_b$—SiR$_a$(OR$^2$)$_{3-a}$    (III)

and

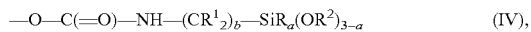

—O—C(=O)—NH—(CR$^1$$_2$)$_b$—SiR$_a$(OR$^2$)$_{3-a}$    (IV), where the radicals and indices have one of the definitions specified above. More preferably, the end groups of the inventively employed compounds (A) are groups of the formula (IV).

The compounds (A) are preferably silane-terminated polyoxyalkylenes, more preferably silane-terminated polyoxypropylenes, having end groups of the formula (IV), where R$^1$ is hydrogen atom, R is the methyl radical, R$^2$ is the methyl or ethyl radical, b is 1 or 3, and a is 0 or 1. Apart from the end groups (IV), these silane-terminated polyoxyalkylenes preferably have exclusively polyether units. The polymers (A) preferably possess 2 or 3, more preferably 2, end groups of the formula (IV) per molecule.

A great advantage of silane-terminated polyoxyalkylenes having end groups of the formula (IV) relative to silane-terminated polyoxyalkylenes with other end groups is their ease of preparation by reaction of common polyoxyalkylenes, terminated with hydroxyl groups, and silanes of the formula

OCN—(CR$^1$$_2$)$_b$—SiR$_a$(OR$^2$)$_{3-a}$    (V)

in which all the radicals and indices have one of the definitions stated above. It is critical that this reaction achieves largely complete termination of the chain ends present, thereby significantly distinguishing the resulting products from products of other methods such as a hydrosilylation of α,ω-unsaturated polymers with SiH-functional silanes.

This largely complete termination results surprisingly in much better properties, especially in much better tensile strength on the part of the cured compositions (K) comprising the polymers (A), in comparison to polymers whose end groups have been produced by another route such as via hydrosilylation.

The silane-terminated polymers (A) are preferably polymers whose chain ends are terminated to an extent of at least 85%, more preferably at least 90%, most preferably at least 95%, with end groups of the formula (IV). Especially preferred as compounds (A) are linear polyoxypropylenes whose chains are terminated to an extent of at least 85%, more preferably at least 90%, most preferably at least 95%, with end groups of the formula (IV).

The number-average molecular weights M$_n$ of the compounds (A) are preferably at least 10,000 g/mol, more preferably at least 11,000 g/mol, and preferably not more than 30,000 g/mol, more preferably not more than 24,000 g/mol, most preferably not more than 22,000 g/mol.

The viscosity of the compounds (A) is preferably at least 0.2 Pa·s, more preferably at least 1 Pa·s, most preferably at least 5 Pa·s, and preferably not more than 700 Pa·s, more preferably not more than 100 Pa·s, in each case measured at 20° C.

The inventively employed compounds (A) may comprise only one kind of compound of the formula (I) or else mixtures of different kinds of compounds of the formula (I). The compounds (A) may contain exclusively compounds of the formula (I) in which more than 90%, preferably more than 95%, more preferably more than 98% of all silyl groups bonded to the radical Y are identical. However, it is also possible, to use compounds (A) which consist at least partially of compounds of the formula (I) in which different silyl groups are bonded to a radical Y. Lastly, mixtures of different compounds of the formula (I) may be used as compounds (A) in which in total at least two different kinds of silyl groups bonded to radicals Y are present, but where all silyl groups each bonded to one radical Y are identical.

If the compounds (A) comprise different kinds of compounds of the formula (I), preference is given to mixtures which comprise compounds (A1) having end groups of the formula (III) or (IV) in which b=1, $R^2$=H, and a=0 or 1, and also compounds (A2) having end groups of the formula (III) or (IV) in which b=3, $R^1$=H, and a=0, and particular preference to those in which the weight ratio of (A1) to (A2) is 0.1 to 10, preferably 0.2 to 5.

In one preferred embodiment of the invention, a mixture of different compounds (A) is used, comprising at least one compound (A1) having end groups of the formula (IV) in which b=1, $R^1$=H, a=1, and $R^2$=CH$_3$, and at least one compound (A2) having end groups of the formula (IV) in which b=3, $R^2$=H, a=0, and $R^2$=CH$_3$, with a weight ratio of (A1) to (A2) of preferably 0.1 to 10, more preferably of 0.2 to 5.

The compounds (A) are commercial products or can be prepared by methods that are commonplace within chemistry.

Based on 100 parts by weight of compounds (A) in component (K1), the compositions (K) contains in total preferably 30 to 1000 parts by weight, more preferably 60 to 500 parts by weight, most preferably 80 to 300 parts by weight of silicone resins (B). The total amount of silicone resins (B) may be present entirely in component (K1), entirely in component (K2), or else in parts in both components (K1) and (K2).

The silicone resins (B) are preferably present either exclusively in component (K2) or else in both components (K1) and (K2). Component (K2) in that case contains preferably at least 10%, more preferably at least 30%, most preferably at least 50% of the total amount of silicone resins (B) present in the composition (K).

The silicone resins (B) consist preferably of at least 90 wt % of units of the formula (II). Most preferably, silicone resins (B) consist exclusively of units of the formula (II).

Examples of radicals $R^3$ are the examples specified above for R. Radical $R^3$ preferably comprises monovalent, SiC-bonded aliphatic or aromatic hydrocarbon radicals which are optionally substituted by halogen atoms and which have 1 to 18 carbon atoms, more preferably the methyl or phenyl radical. In particular, all radicals $R^3$ are exclusively methyl and phenyl radicals.

Examples of radical $R^4$ are hydrogen atom or the examples specified for radical R. Radical $R^4$ preferably comprises hydrogen atom or alkyl radicals having 1 to 10 carbon atoms that are optionally substituted by halogen atoms, more preferably hydrogen atom or alkyl radicals having 1 to 4 carbon atoms, more preferably the methyl, ethyl, or butyl radical, most preferably the methyl radical.

Phenylsilicone resins are used with preference as compound (B). Most preferably, the phenylsilicone resins (B) consist exclusively of units of the formula (II) in which at least 10%, preferably at least 50%, more preferably at least 60% of all units of the formula (II) have at least one SiC-bonded phenyl group.

Employed with preference are silicone resins (B) in which c+d is less than 3. In one embodiment, phenylsilicone resins (B) are used which contain, based in each case on the total number of units of the formula (II), at least 50%, more preferably at least 60%, of units of the formula (II) in which c is 1.

In one preferred embodiment, silicone resins (B) are used which have exclusively units of the formula (II) in which c is 0, 1, or 2, with the proviso that c is equal to 0 or 1 in at least 50% of the units of the formula (II).

In one preferred embodiment, silicone resins (B) are used which have exclusively units of the formula (II) in which c is 1 or 2.

In one specific embodiment, silicone resins (B) are used which have exclusively units of the formula (II) in which c is 1.

Preference is given to using silicone resins (B) which have, based in each case on the total number of units of the formula (II), at least 70%, more preferably at least 80%, of units of the formula (II) in which d is 0 or 1.

Preference is given to using silicone resins (B) which, based in each case on the total number of units of the formula (II), have 30% to 95%, more preferably 30% to 90%, of units of the formula (II) in which d is 0.

Examples of silicone resins (B) are organopolysiloxane resins which consist substantially, preferably exclusively, of (Q) units of the formulae SiO$_{4/2}$, Si(OR$^4$)O$_{3/2}$, Si(OR$^4$)$_2$O$_{2/2}$, and Si(OR$^4$)$_3$O$_{1/2}$, (T) units of the formulae PhSiO$_{3/2}$, PhSi(OR$^4$)O$_{2/2}$, and PhSi(OR$^4$)$_2$O$_{1/2}$, (D) units of the formulae Me$_2$SiO$_{2/2}$ and Me$_2$Si(OR$^4$)O$_{1/2}$, and also (M) units of the formula Me$_3$SiO$_{1/2}$, where Me is the methyl radical, Ph is the phenyl radical, and $R^4$ is the methyl, ethyl, or butyl radical, preferably the methyl radical, with the resin containing preferably 0-2 mol of (Q) units, 0-2 mol of (D) units, and 0-2 mol of (M) units per mol of (T) units.

Preferred examples of silicone resins (B) are organopolysiloxane resins which consist substantially, preferably exclusively, of T units of the formulae PhSiO$_{3/2}$, PhSi(OR$^4$)O$_{2/2}$, and PhSi(OR$^4$)$_2$O$_{1/2}$, and T units of the formulae MeSiO$_{3/2}$, MeSi(OR$^4$)O$_{2/2}$, and MeSi(OR$^4$)$_2$O$_{1/2}$, and also, optionally, D units of the formulae Me$_2$SiO$_{2/2}$ and Me$_2$Si(OR$^4$)O$_{1/2}$, where Me is the methyl radical, Ph is the phenyl radical, and $R^4$ is the methyl, ethyl, or butyl radical, preferably the methyl radical. The molar ratio of phenylsilicone to methylsilicone units is between 0.5 and 2.0. The amount of D units in these silicone resins is preferably below 10 wt %.

Additionally, preferred examples of silicone resins (B) are organopolysiloxane resins which consist substantially, preferably exclusively, of T units of the formulae PhSiO$_{3/2}$, PhSi(OR$^4$)O$_{2/2}$, and PhSi(OR$^4$)$_2$O$_{1/2}$, where Ph is the phenyl radical and $R^4$ is the methyl, ethyl, or butyl radical, preferably the methyl radical.

The silicone resins (B) preferably possess a number-average molar mass $M_n$ of at least 400 g/mol and more preferably of at least 600 g/mol. The average molar mass $M_n$ is preferably not more than 400,000 g/mol, more preferably not more than 100,000 g/mol, most preferably not more than 50,000 g/mol. The silicone resins (B) may be either solid or liquid at 23° C. and 1000 hPa, with liquid silicone resins being preferred.

The compounds (B) may be prepared by methods which are commonplace within chemistry, and/or are commercial products such as the products SILRES® IC 368, SILRES® IC 678, or SILRES® SY231, for example, available commercially from Wacker Chemie AG, Munich (DE).

The silicone resins (B) may be used either in pure form or in the form of a solution in a suitable solvent.

Solvents that may be used in this case include substances such as ethers (e.g., diethyl ether, methyl tert-butyl ether, ether derivatives of glycol, THF), esters (e.g., ethyl acetate, butyl acetate, glycol esters), hydrocarbons (e.g., pentane, cyclopentane, hexane, cyclohexane, heptane, octane, or else longer-chain, branched and unbranched alkanes), ketones (e.g., acetone, methyl ethyl ketone), aromatics (e.g., toluene, xylene, ethylbenzene, chlorobenzene), or else alcohols (e.g., methanol, ethanol, glycol, propanol, isopropanol, glycerol, butanol, isobutanol, tert-butanol). But preference is given to using silicone resins (B) which are free from organic solvents.

Water may be present directly in the form of aqueous preparations or as water absorbed by or present in solids.

Examples of aqueous preparations are aqueous emulsions such as emulsions of water in plasticizer (C), solvent (F), and/or silicone resins (B). Optionally, there may also be a thickener (E) and/or fillers (D) present.

The following are examples of water present in solids: moisture bonded to fillers such as highly dispersed fillers, for example, hydrophilic silicas or ground calcium carbonates, which may contain up to about 1 wt % of water bonded on the surface.

Further examples of water present in solids are fillers such as precipitated calcium carbonates, which contain physically bonded water in the interior of the filler particles, or particles of water encased in wax-like or resin-like polymers.

For the preparation of component (K2), water is preferably used directly.

In addition to the compounds (A), (B), and water, the compositions (K) may further include all substances which have also been used to date in crosslinkable compositions and which are different from compounds (A) and (B) Examples are as follows: plasticizers (C), fillers (D), thickeners (E), solvents (F), organosilicon compound (G) containing basic nitrogen, catalysts (H), adhesion promoters (I), water scavengers (J), additives (L), and adjuvants (M).

Plasticizer (C) preferably comprises phthalic esters, adipic esters, benzoic esters, glycolic esters, esters of saturated alkanediols, phosphoric esters, sulfonic esters, polyesters, polyethers, polystyrenes, polybutadienes, polyisobutylenes, paraffinic hydrocarbons, and branched hydrocarbons of high molecular mass.

Preference is given to using plasticizers (C) having molar masses, or, in the case of polymeric plasticizers, average molar masses $M_n$ of 200 to 20,000 g/mol, more preferably of 500 to 10,000 g/mol, most preferably of 900 to 8000 g/mol.

Plasticizers (C) may be a part of component (K1) and part of component (K2). They may also be present in both components (K1) and (K2).

If the compositions (K) include plasticizers (C), the amounts involved are preferably 1 to 200 parts by weight, more preferably 5 to 100 parts by weight, based in each case on 100 parts by weight of constituent (A).

The fillers (D) optionally employed in the compositions (K) may be any desired fillers known to date. Examples of fillers (D) are nonreinforcing fillers, these being fillers having a BET surface area of preferably up to 50 m$^2$/g, such as quartz; diatomaceous earth; calcium silicate; zirconium silicate; talc; kaolin; zeolites; metal oxide powders such as aluminum oxides, titanium oxides, iron oxides, zinc oxides, and/or their mixed oxides; barium sulfate; calcium carbonate; gypsum; silicon nitride; silicon carbide; boron nitride; glass powders and polymeric powders such as polyacrylonitrile powders; reinforcing fillers, these being fillers having a BET surface area of more than 50 m$^2$/g such as pyrogenically prepared silica, precipitated silica, precipitated chalk, carbon black such as furnace black and acetylene black, and mixed silicon/aluminum oxides of high BET surface area; aluminum trihydroxide, fillers in the form of hollow beads such as ceramic microbeads, examples being those obtainable under the trade name Zeeospheres™ from 3M Deutschland GmbH of Neuss, Germany; elastic polymeric beads, for example obtainable under the trade name EXPANCEL® from AKZO NOBEL, Expancel, of Sundsvall, Sweden, or glass beads; fillers in fiber form such as asbestos and also polymeric fibers. The stated fillers may have been hydrophobized, for example by treatment with organosilanes, and/or organosiloxanes, or with stearic acid, or by etherification of hydroxyl groups to alkoxy groups.

The optionally employed fillers (D) are preferably calcium carbonate, talc, aluminum trihydroxide, and silica, particular preference being given to aluminum trihydroxide. Preferred calcium carbonate grades are ground or precipitated and have optionally been surface-treated with fatty acids such as stearic acid or salts thereof. The preferred silica is preferably fumed silica. The optionally employed fillers (D) have a moisture content of preferably below 1 wt %, more preferably below 0.5 wt %.

Fillers (D) may be a part of component (K1) and of component (K2). They may also be present in both components (K1) and (K2).

If the compositions (K) do comprise fillers (D), the amounts in question are preferably 10 to 1000 parts by weight, more preferably 50 to 500 parts by weight, most preferably 80 to 300 parts by weight, based in each case on 100 parts by weight of constituent (A). The compositions (K) do preferably comprise fillers (D).

In one embodiment, the compositions (K) comprise a combination of a) silica, more particularly fumed silica, and b) calcium carbonate, aluminum trihydroxide, and/or talc as fillers (D). If the compositions (K) do comprise this particular combination of different fillers (D), they comprise preferably 1 to 80 parts by weight, more preferably 5 to 40 parts by weight, of silica, preferably fumed silica, and preferably 10 to 500 parts by weight, more preferably 50 to 300 parts by weight, of calcium carbonate, aluminum trihydroxide, talc, or mixtures of these materials, based in each case on 100 parts by weight of constituent (A).

The thickeners (E) used optionally in the compositions (K) are preferably water-soluble or water-swellable polymers, or inorganic thickeners. Examples of organic thickeners (E) are starch, dextrins, oligosaccharides, cellulose, cellulose derivatives such as carboxymethylcellulose, cellulose ethers, methylcellulose, hydroxyethylcellulose, or hydroxypropylcellulose, agar, alginates, pectins, gelatin, carrageenan, tragacanth, gum arabic, casein, polyacrylamide, poly(meth)acrylic acid derivatives, polyethylene glycol, polyvinyl ethers, polyvinyl alcohols, polyamides, or polyimines. Examples of inorganic thickeners (E) are polysilicas, fumed silicas, aluminosilicates, or clay minerals.

If thickeners (E) are used, they are preferably constituents of component (K2). If the composition (K) of the invention comprises thickeners (E) in component (K2), the amounts in question are preferably 0.5 to 100 parts by weight, more preferably 1 to 30 parts by weight, based in each case on 100 parts by weight of constituent (A) in component (K1). Examples of organic solvents (F) are the compounds already specified above as solvents, preferably alcohols. Solvents (F) may be a part of component (K1) and of component (K2). They may be also present in both components (K1) and (K2). But preferably, no organic solvents (F) are added to the compositions (K).

The compounds (G) that are employed optionally in the compositions (K) are preferably organosilicon compounds which are different from the compounds (A) and (B) and which comprise units of the formula $$D_g Si(OR^5)_f R^6_e O_{(4-e-f-g)/2} \qquad (VI),$$

in which

R$^5$ represents identical or different hydrogen atom or optionally substituted hydrocarbon radicals, D represents identical or different monovalent, SiC-bonded radical containing basic nitrogen, $R^6$ represents identical or different monovalent, optionally substituted, SiC-bonded organic radical free from basic nitrogen, e is 0, 1, 2, or 3, preferably 1 or 0, f is 0, 1, 2, or 3, preferably 1, 2, or 3, more preferably 2 or 3, and g is 0, 1, 2, 3, or 4, preferably 1, with the proviso that the sum of e+f+g is less than or equal to 4, and there is at least one radical D present per molecule.

The organosilicon compounds (G) used optionally may be not only silanes, i.e., compounds of the formula (VI) with e+f+g=4, but also siloxanes, i.e., compounds comprising units of the formula (VI) with e+f+g≤3, with preference being given to silanes.

Examples of optionally substituted hydrocarbon radicals $R^5$ are the examples specified for radical R.

The radicals $R^5$ are preferably hydrogen atom and hydrocarbon radicals that are optionally substituted by halogen atoms and that have 1 to 18 carbon atoms; more preferably, hydrogen atom and hydrocarbon radicals that have 1 to 10 carbon atoms; most preferably, the methyl radical and the ethyl radical.

Examples of radical $R^6$ are the examples specified for R.

Radical $R^6$ preferably comprises hydrocarbon radicals that are optionally substituted by halogen atoms and that have 1 to 18 carbon atoms, more preferably hydrocarbon radicals having 1 to 5 carbon atoms, most preferably the methyl radical.

Examples of radicals D are radicals of the formulae $H_2N(CH_2)_3$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $C_3H_7NH(CH_2)_3$—, $C_4H_9NH(CH_2)_3$—, $C_5H_{11}NH(CH_2)_3$—, $C_6H_{13}NH(CH_2)_3$—, $C_7H_{15}NH(CH_2)_3$—, $H_2N(CH_2)_4$—, $H_2N$—$CH_2$—$CH(CH_3)$—$CH_2$—, $H_2N(CH_2)_5$—, cyclo-$C_5H_9NH(CH_2)_3$—, cyclo-$C_6H_{11}NH(CH_2)_3$—, phenyl-NH$(CH_2)_3$—, $(CH_3)_2N(CH_2)_3$—, $(C_2H_5)_2N(CH_2)_3$—, $(C_3H_7)_2NH(CH_2)_3$—, $(C_4H_9)_2NH(CH_2)_3$—, $(C_5H_{11})_2NH(CH_2)_3$—, $(C_6H_{13})_2NH(CH_2)_3$—, $(C_7H_{15})_2NH(CH_2)_3$—, $H_2N(CH_2)$—, $H_2N(CH_2)_2NH(CH_2)$—, $H_2N(CH_2)_2NH(CH_2)_2NH(CH_2)$—, $H_3CNH(CH_2)$—, $C_2H_5NH(CH_2)$—, $C_3H_7NH(CH_2)$—, $C_4H_9NH(CH_2)$—, $C_5H_{11}NH(CH_2)$—, $C_6H_{13}NH(CH_2)$—, $C_7H_{15}NH(CH_2)$—, cyclo-$C_5H_9NH(CH_2)$—, cyclo-$C_6H_{11}NH(CH_2)$—, phenyl-NH$(CH_2)$—, $(CH_3)_2N(CH_2)$—, $(C_2H_5)_2N(CH_2)$—, $(C_3H_7)_2NH(CH_2)$—, $(C_4H_9)_2NH(CH_2)$—, $(C_5H_{11})_2NH(CH_2)$—, $(C_6H_{13})_2NH(CH_2)$—, $(C_7H_{15})_2NH(CH_2)$—, $(CH_3O)_3Si(CH_2)_3NH(CH_2)_3$—, $(C_2H_5O)_3Si(CH_2)_3NH(CH_2)_3$—, $(CH_3O)_2(CH_3)Si(CH_2)_3NH(CH_2)_3$—, and $(C_2H_5O)_2(CH_3)Si(CH_2)_3NH(CH_2)_3$—, and also reaction products of the abovementioned primary amino groups with compounds containing epoxide groups or double bonds that are reactive toward primary amino groups.

Radical D preferably comprises the $H_2N(CH_2)_3$—, $H_2N(CH_2)_2NH(CH_2)_3$—, and cyclo-$C_6H_{11}NH(CH_2)_3$— radical.

Examples of the silanes of the formula (VI) that are used optionally are $H_2N(CH_2)_3$—$Si(OCH_3)_3$, $H_2N(CH_2)_3$—$Si(OC_2H_5)_3$, $H_2N(CH_2)_3$—$Si(OCH_3)_2CH_3$, $H_2N(CH_2)_3$—$Si(OC_2H_5)_2CH_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3$, $H_2N(CH_2)_2NH(CH_2)_3$—$Si(OH)_3$, $H_2N(CH_2)_2NH(CH_2)_3$—$Si(OH)_2CH_3$, $H_2N(CH_2)_2NH(CH_2)_2NH(CH_2)_3$—$Si(OCH_3)_3$, $H_2N(CH_2)_2NH(CH_2)_2NH(CH_2)_3$—$Si(OC_2H_5)_3$, cyclo-$C_6H_{11}NH(CH_2)_3$—$Si(OCH_3)_3$, cyclo-$C_6H_{11}NH(CH_2)_3$—$Si(OC_2H_5)_3$, cyclo-$C_6H_{11}NH(CH_2)_3$—$Si(OCH_3)_2CH_3$, cyclo-$C_6H_{11}NH(CH_2)_3$—$Si(OC_2H_5)_2CH_3$, cyclo-$C_6H_{11}NH(CH_2)_3$—$Si(OH)_3$, cyclo-$C_6H_{11}NH(CH_2)_3$—$Si(OH)_2CH_3$, phenyl-NH$(CH_2)_3$—$Si(OCH_3)_3$, phenyl-NH$(CH_2)_3$—$Si(OC_2H_5)_3$, phenyl-NH$(CH_2)_3$—$Si(OCH_3)_2CH_3$, phenyl-NH$(CH_2)_3$—$Si(OC_2H_5)_2CH_3$, phenyl-NH$(CH_2)_3$—$Si(OH)_3$, phenyl-NH$(CH_2)_3$—$Si(OH)_2CH_3$, HN$((CH_2)_3$—$Si(OCH_3)_3)_2$, HN$((CH_2)_3$—$Si(OC_2H_5)_3)_2$, HN$((CH_2)_3$—$Si(OCH_3)_2CH_3)_2$, HN$((CH_2)_3$—$Si(OC_2H_5)_2CH_3)_2$, cyclo-$C_6H_{11}NH(CH_2)$—$Si(OCH_3)_3$, cyclo-$C_6H_{11}NH(CH_2)$—$Si(OC_2H_5)_3$, cyclo-$C_6H_{11}NH(CH_2)$—$Si(OCH_3)_2CH_3$, cyclo-$C_6H_{11}NH(CH_2)$—$Si(OC_2H_5)_2CH_3$, cyclo-$C_6H_{11}NH(CH_2)$—$Si(OH)_3$, cyclo-$C_6H_{11}NH(CH_2)$—$Si(OH)_2CH_3$, phenyl-NH$(CH_2)$—$Si(OCH_3)_3$, phenyl-NH$(CH_2)$—$Si(CH_2H_5)_3$, phenyl-NH$(CH_2)$—$Si(OCH_3)_2CH_3$, phenyl-NH$(CH_2)$—$Si(OC_2H_5)_2CH_3$, phenyl-NH$(CH_2)$—$Si(OH)_3$, and phenyl-NH$(CH_2)$—$Si(OH)_2CH_3$, and also their partial hydrolysates, with preference being given to $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OC_2H_5)_3$, and cyclo-$C_6H_{11}NH(CH_2)_3$—$Si(OCH_3)_2CH_3$, and also, in each case, their partial hydrolysates, and particular preference being given to $H_2N(CH_2)_2NH(CH_2)_3$—$Si(OCH_3)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OCH_3)_2CH_3$, and also, in each case, their partial hydrolysates.

The organosilicon compounds (G) used optionally may also take on the function of a curing catalyst or curing cocatalyst. Furthermore, the organosilicon compounds (G) may act as adhesion promoters and/or water scavengers. The organosilicon compounds (G) are commercial products and/or can be prepared by methods that are commonplace within chemistry.

If organosilicon compounds (G) containing basic nitrogen are used, they are preferably constituents of component (K1). If the component (K1) does comprise compounds (G), the amounts in question are preferably 0.1 to 25 parts by weight, more preferably 0.5 to 10 parts by weight, in each case based on 100 parts by weight of compounds (A). Component (K1) does preferably comprise compounds (G).

The catalysts (H), used optionally, may be any desired catalysts known to date for compositions that cure by silane condensation.

Examples of metal-containing curing catalysts (H) are organotitanium and organotin compounds, examples being titanic esters, such as tetrabutyl titanate, tetrapropyl titanate, tetraisopropyl titanate, and titanium tetraacetylacetonate; tin compounds, such as dibutyltin dilaurate, dibutyltin maleate, dibutyltin diacetate, dibutyltin dioctanoate, dibutyltin acetylacetonate, dibutyltin oxides, and corresponding dioctyltin compounds.

Examples of metal-free curing catalysts (H) are basic compounds such as triethylamine, tributylamine, 1,4-diazabicyclo[2.2.2]octane, 1,5-diazabicyclo[4.3.0]non-5-ene, 1,8-diazabicyclo[5.4.0]undec-7-ene, N,N-bis-(N,N-dimethyl-2-aminoethyl)methylamine, N,N-dimethylcyclohexylamine, N,N-dimethylphenylamine, and N-ethylmorpholinine, guanidine derivatives such as mono-, di-, tri- tetra-, or pentamethylguanidine.

It is likewise possible to use acidic compounds such as phosphoric acid and its esters, toluenesulfonic acid, sulfuric acid, nitric acid, or else organic carboxylic acids such as acetic acid and benzoic acid as catalyst (H).

In this context, catalysts (H) may be a part =of component (K1) and of component (K2). Catalysys (H) may also be present in both components (K1) and (K2), but preferably they are added only to one of the components, (K1) or (K2).

If the compositions (K) do comprise catalysts (H), the amounts involved are preferably 0.01 to 20 parts by weight, more preferably 0.05 to 5 parts by weight, based in each case on 100 parts by weight of compounds (A).

In one embodiment, the catalysts (H) optionally employed are metal-containing curing catalysts, preferably tin-containing catalysts. This embodiment is especially preferred when the compounds (A) consist wholly or at least partly, in other words to an extent of at least 90 wt %, preferably at least 95 wt %, of compounds of the formula (I) in which b is not 1.

Preferably, the compositions (K) do not contain metal-containing catalysts (H), and more preferably catalysts containing tin, when the compounds (A) consist wholly or at least partly, in other words to an extent of at least 10 wt %, preferably at least 20 wt %, of compounds of the formula (I) in which b is 1 and $R^1$ represents hydrogen atom. This embodiment without metal-containing and more particularly without tin-containing catalysts is especially preferred.

The adhesion promoters (I) employed optionally in the compositions (K) may be any desired adhesion promoters that have been described hitherto for systems that cure by silane condensation and that are different from the compounds (G).

Examples of adhesion promoters (I) are epoxy silanes such as glycidyloxypropyltrimethoxysilanes, glycidyloxypropylmethyldimethoxysilane, glycidyloxypropyltriethoxysilane, or glycidyloxypropylmethyldiethoxysilane, 2-(3-triethoxysilylpropyl)maleic anhydride, N-(3-trimethoxysilylpropyl)urea, N-(3-triethoxysilylpropyl)urea, N-(trimethoxysilylmethyl)urea, N-(methyldimethoxysilymethyl)urea, N-(3-triethoxysilylmethyl)urea, N-(3-methyldiethoxysilylmethyl)urea, O-methylcarbamatomethylmethyldimethoxysilane, O-methylcarbamatomethyltrimethoxysilane, O-ethylcarbamatomethylmethyldiethoxysilane, O-ethylcarbamatomethyltriethoxysilane, 3-methacryloyloxypropyltrimethoxysilane, methacryloyloxymethyltrimethoxysilane, methacryloyloxymethylmethyldimethoxysilane, methacryloyloxymethyltriethoxysilane, methacryloyloxymethylmethyldiethoxysilane, 3-acryloyloxypropyltrimethoxysilane, acryloyloxymethyltrimethoxysilane, acryloyloxymethylmethyldimethoxysilanes, acryloyloxymethyltriethoxysilane, and acryloyloxymethylmethyldiethoxysilane, and also their partial condensates.

If adhesion promoters (I) are used, they are preferably constituents of component (K1). If component (K1) does comprise adhesion promoters (I), the amounts involved are preferably 0.5 to 30 parts by weight, more preferably 1 to 10 parts by weight, based in each case on 100 parts by weight of compounds (A).

The water scavengers (J) employed optionally in the compositions (K) may be any desired water scavengers that have been described for systems that cure by silane condensation and that are different from compounds (G) and (I).

Examples of water scavengers (J) are silanes such as vinyltrimethoxysilane, vinyltriethoxysilane, vinylmethyldimethoxysilane, O-methylcarbamatomethylmethyldimethoxysilane, O-methylcarbamatomethyltrimethoxysilane, O-ethylcarbamatomethylmethyldiethoxysilane, O-ethylcarbamatomethyltriethoxysilane, and/or their partial condensates, and also orthoesters, such as 1,1,1-trimethoxyethane, 1,1,1-triethoxyethane, trimethoxymethane, and triethoxymethane.

If water scavengers (J) are used, they are preferably constituents of component (K1). If component (K1) does comprise water scavengers (J), the amounts involved are preferably 0.5 to 30 parts by weight, more preferably 1 to 10 parts by weight, based in each case on 100 parts by weight of compounds (A). Component (K1) preferably does comprise water scavengers (J).

The additives (L) employed optionally in the compositions (K) may be any desired additives known to date and typical for silane-crosslinking systems.

The optionally employed additives (L) are preferably antioxidants, UV stabilizers such as so-called HALS compounds, for example, fungicides, and pigments.

Furthermore, the components (K2) may also comprise—as additives—emulsifiers which enhance the compatibility or emulsifiability of water and the other constituents of this component. In that case, the emulsifiers in question may include both ionic and nonionic emulsifiers.

Additives (L) may be a part of component (K1) and component (K2). Additives (L) may also be present in both components, (K1) and (K2). If the compositions (K) do comprise additives (L), the amounts involved are preferably 0.01 to 30 parts by weight, more preferably 0.1 to 10 parts by weight, based in each case on 100 parts by weight of constituent (A). The compositions (K) do preferably comprise additives (L).

The adjuvants (M), employed optionally, preferably are tetraalkoxysilanes, for example tetraethoxysilane and/or partial condensates thereof, reactive plasticizers, rheological additives, and flame retardants.

Preferred reactive plasticizers (M) are compounds which contain alkyl chains having 6 to 40 carbon atoms and possess a group reactive toward the compounds (A). Examples are isooctyltrimethoxysilane, isooctyltriethoxysilane, N-octyltrimethoxysilane, N-octyltriethoxysilane, decyltrimethoxysilane, decyltriethoxysilane, dodecyltrimethoxysilane, dodecyltriethoxysilane, tetradecyltrimethoxysilane, tetradecyltriethoxysilane, hexadecyltrimethoxysilane, and hexadecyltriethoxysilane.

The rheological additives (M) are preferably polyamide waxes, hydrogenated castor oils, or stearates.

Flame retardants (M) may be all typical flame retardants of the kind typical for adhesive and sealant systems, more preferably halogenated compounds and derivatives, especially esters, of phosphoric acid.

Adjuvants (M) may be a part of component (K1) and component (K2). Adjuvants (M) may also be present in both components, (K1) and (K2). Adjuvants (M) may be a part of component (K1) and component (K2). Adjuvants (M) may also be present in both components, (K1) and (K2). If the compositions (K) comprise one or more components (M), the amounts involved are in each case preferably 0.5 to 200 parts by weight, more preferably 1 to 100 parts by weight, most preferably 2 to 70 parts by weight, based in each case on 100 parts by weight of component (A).

Component (K2) of the compositions (K) comprises water in amounts of preferably 0.1 to 20 parts by weight, more preferably 0.2 to 10 parts by weight, most preferably 0.3 to 5 parts by weight, based in each case on 100 parts by weight of the compounds (A) used in component (K1).

Component (K2) of the compositions (K) comprises preferably 2 to 400 parts by weight, more preferably 5 to 200 parts by weight, most preferably at least 10 to 100 parts by weight, of at least one further substance selected from silicone resins (B), plasticizers (C), fillers (D), thickeners (E), and solvents (F), based in each case on 100 parts by weight of the compounds (A) used in the first component (K1).

The compositions (K) are preferably compositions consisting of component (K1) comprising:
(A) 100 parts by weight of compounds of the formula (I), optionally
(B) silicone resins comprising units of the formula (II), optionally
(C) plasticizers, optionally
(D) fillers, optionally
(F) solvents, optionally
(G) compound containing basic nitrogen, optionally
(H) catalysts, optionally
(I) adhesion promoters, optionally
(J) water scavengers, optionally
(L) additives, and optionally
(M) adjuvants
and also component (K2) comprising, based in each case on 100 parts by weight of compounds (A), at least 0.05 part by weight of water and also at least 1 part by weight of at least one substance selected from
(B) silicone resins comprising units of the formula (II),
(C) plasticizers,
(D) fillers,
(E) thickeners, and
(F) solvents,
and also optionally
(H) catalysts, optionally
(L) additives, and optionally
(M) adjuvants,
with the proviso that the compositions (K) contain in total at least 10 parts by weight of silicone resins (B).

The compositions (K) are more preferably compositions consisting of component (K1) comprising:
(A) 100 parts by weight of compounds of the formula (I), optionally
(B) silicone resins comprising units of the formula (II), optionally
(C) plasticizers, optionally
(D) fillers, optionally
(F) solvents,
(G) 0.1 to 25 parts by weight of compound containing basic nitrogen, optionally
(H) catalysts, optionally
(I) adhesion promoters, optionally
(J) water scavengers, optionally
(L) additives, and optionally
(M) adjuvants
and also component (K2) comprising, based in each case on 100 parts by weight of compounds (A),
0.1 to 20 parts by weight, more preferably 0.2 to 10 parts by weight, of water and also 2 to 400 parts by weight, more preferably 5 to 200 parts by weight, of at least one substance selected from
(B) silicone resins comprising units of the formula (II),
(C) plasticizers,
(D) fillers,
(E) thickeners, and
(F) solvents,
and also optionally
(H) catalysts, optionally
(L) additives, and optionally
(M) adjuvants,
with the proviso that the compositions (K) contain in total 30 to 1000 parts by weight of silicone resins (B).

The compositions (K) preferably contain no other constituents apart from the compounds (A), (B), (C), (D), (E), (F), (G), (H), (I), (J), (L), (M), and water.

The constituents employed may in each case comprise one kind of such a constituent or else a mixture of at least two kinds of a respective constituent.

The inventively employed component (K1) has viscosities of preferably 500 to 1,000,000 mPas, more preferably of 1000 to 500,000 mPas, most preferably 1000 to 20,000 mPas, in each case at 25° C.

The inventively employed component (K2) has viscosities of preferably 500 to 1,000,000 mPas, more preferably of 1000 to 500,000 mPas, most preferably 1000 to 20,000 mPas, in each case at 25° C.

The proportion of components (K1) and (K2) may in principle be selected arbitrarily, provided the above-required proportions between compound (A) in component (K1) and water and/or further substances in component (K2), and also the required total amount of resin, are attained. The proportions of (K1) to (K2) are preferably between 20:1 and 1:5, more preferably between 12:1 and 1:2.

The components (K1) and (K2) may be produced in any desired way that is known per se for instance, by methods and mixing techniques of the kind customary for the production of moisture-curing compositions. The sequence in which the various constituents are mixed with one another may be varied arbitrarily.

The present invention additionally provides a method for producing the compositions (K) by mixing together components (K1) and (K2) and also, optionally, further components, the individual components having been produced by separate mixing together of all of constituents of the respective components in any order.

This mixing may take place at room temperature under the pressure of the surrounding atmosphere, in other words around 900 to 1100 hPa. If desired, however, this mixing may also take place at higher temperatures, for example at temperatures in the range from 30 to 130° C. It is also possible to carry out mixing occasionally or continually under reduced pressure such as at an absolute pressure of 30 to 500 hPa, for example to remove volatile compounds and/or air.

The mixing of component (K1) takes place preferably in the absence of moisture.

The method may be carried out continuously or discontinuously.

The individual components of the composition are storage-stable premixes, which can then be mixed shortly before or during processing, more particularly on location.

The crosslinking of the compositions (K) takes place during or after contacting of components (K1) and (K2) preferably at room temperature, with preference being given to mechanical mixing. The crosslinking of the compositions (K) may also take place, if desired, at temperatures higher or lower than room temperature, for example at −5° to 15° C. or 30° to 50° C.

The crosslinking is carried out preferably under a pressure of 100 to 1100 hPa, more preferably under atmospheric pressure.

The invention further provides shaped articles produced by crosslinking the compositions (K).

The shaped articles may be any desired shaped articles, for instance, seals, compressed articles, extruded profiles, coatings, impregnation systems, encapsulation, lenses, prisms, polygonal structures, laminate layers, or adhesive layers.

After curing, the compositions (K) have very good tensile shear strengths, measured in accordance with DIN EN 204 after 7-day storage under standard conditions, i.e., at 1000 hPa, 23° C., and preferably at least 6 MPa, more preferably at least 7 MPa, and most preferably at least 9 MPa.

The compositions (K) are used preferably as adhesives. They can be used for bonding any materials, for example wood, concrete, porous stones, paper, fabrics, leather, etc. In contrast to one-component compositions curing only by contact with atmospheric moisture, they are also suitable for the bonding of materials impervious to water, for example metals, glass, water-impervious ceramics, nonporous stones, plastics, painted surfaces, etc. This is so even when very deep bondlines or very thick layers of adhesive would make curing via atmospheric moisture impossible or would at least significantly slow it down. In this case, both like and different materials may be bonded to one another.

Additionally provided are methods for adhesive bonding or sealing of substrates, which comprise first mixing the inventively employed components (K1) and (K2) and also, optionally, further components with one another, and then applying the mixture to the surface of at least one substrate, then contacting the surface with the second substrate to be bonded, and subsequently allowing crosslinking of the composition (K).

Additionally provided are methods for producing coatings or encapsulations, which comprise first mixing the inventively employed components (K1) and (K2), and also, optionally, further components with one another and then applying the mixture to at least one substrate, and subsequently allowing crosslinking of the composition (K).

Examples of this are encapsulating compositions for LEDs or other electronic components, the production of molded articles, composite materials, and composite moldings. A composite molding is a uniform molded article made from a composite material, which is composed of a crosslinking product of the compositions (K) of at least one substrate such that there is a firm, durable bond between the two parts.

The compositions (K) have the advantage that they are easy to produce.

The crosslinkable compositions have the advantage that they are distinguished by very high storage stability.

The crosslinkable compositions have the advantage that after the mixing of components (K1) and (K2) and also, optionally, further components, they exhibit a high crosslinking rate and cure through fully even at high film thicknesses and/or in deep adhesive joints between two substrates impervious to water and to atmospheric moisture.

The crosslinkable compositions further have the advantage that they exhibit an excellent adhesion profile.

Furthermore, the crosslinkable compositions have the advantage that they can be used to obtain adhesives having high tensile shear strength.

Another advantage of the compositions lies in the option, through choice of a low-viscosity component (B), of obtaining compositions having a low viscosity, i.e., very good processing qualities, without the need for this purpose to add large quantities of often unwanted solvents and/or plasticizers.

In the examples described below, all viscosity figures are based on a temperature of 25° C. Unless otherwise specified, the examples below are carried out under atmospheric pressure, in other words approximately at 1000 hPa, and at room temperature, in other words at approximately 23° C., or at a temperature which comes about when the reactants are combined at room temperature without additional heating or cooling, and also at a relative atmospheric humidity of approximately 50%. All statements of parts and percentages, moreover, are based—unless otherwise indicated—on the weight.

EXAMPLES

Preparation Example 1A

Preparation of a K1 Component for a 2-Component Adhesive Formulation (K1-A)

210.0 g of silane-terminated polypropylene glycol having an average molar mass ($M_n$) of 12 000 daltons and end groups of the formula —O—C(=O)—NH—CH$_2$—SiCH$_3$(OCH$_3$)$_2$ (available commercially under the name GENIOSIL® STP-E10 from Wacker Chemie AG, Munich (DE)) are homogenized for two minutes at 200 rpm in a laboratory planetary mixer from PC-Laborsystem, equipped with two cross-arm mixers, at about 25° C. with 58.5 g of a solvent-free, liquid phenylsilicone resin, which is composed of phenyl-functional T units (60-65 wt %) and methyl-functional T units (18-22 wt %), and dimethyl-functional D units (2-4 wt %), and has a methoxy groups content of 12-16 wt % and an average molar mass of 800-1300 daltons (available commercially under the name SILRES® IC 368 from Wacker Chemie AG, Munich (DE)) and 1.5 g of stabilizer (available commercially under the name TINUVIN® 123 from BASF AG, Germany; CAS NO: 129757-67-1). Thereafter 29.4 g of N-(2-aminoethyl)-3-aminopropylmethyldimethoxysilane and 0.6 g of 1,8-diazabicyclo[5.4.0]undec-7-ene (DBU) are mixed in for one minute at 200 rpm. Lastly, homogenization takes place for two minutes at 600 rpm and for one minute at 200 rpm under a pressure of 100 mbar, with stirring until the mixture is free of bubbles.

The completed K1 component (K1-A) is dispensed into a container which can be closed in an airtight manner.

Preparation Example 1B

Preparation of a K1 Component for a 2-Component Adhesive Formulation (K1-B)

The procedure is as for preparation example 1A. However, in the final incorporation step, 15.0 g of N-(2-aminoethyl)-3-aminopropylmethyldimethoxysilane and 15.0 g of a hydroxyl-terminated, liquid poly-[N-(2-aminoethyl)-3-aminopropyl]methylsiloxane having a viscosity of 2000-6000 mPas at 25° C. (available commercially under the name GENIOSIL® GF95 hydrolysate from Wacker Chemie AG, Munich (DE)) are used instead of the mixture of 29.4 g of N-(2-aminoethyl)-3-aminopropylmethyldimethoxysilane and 0.6 g of DBU that was used in example 1A.

The completed K1 component (K1-B) is dispensed into a container which can be closed in an airtight manner.

Preparation Example 1C

Preparation of a K1 Component for a 2-Component Adhesive Formulation (K1-C)

In 135 g of silane-terminated polypropylene glycol having an average molar mass ($M_n$) of 12,000 daltons and end groups of the formula —O—C(=O)—NH—CH$_2$—SiCH$_3$(OCH$_3$)$_2$ (available commercially under the name GENIOSIL® STP-E10 from Wacker Chemie AG, Munich (DE)), in a laboratory planetary mixer from PC-Laborsystem, equipped with two cross-arm mixers, at about 25° C., 150.0 g of aluminum trihydroxide having a BET surface area of 3-5 m$^2$/g and a d50 value of 1.7-2.1 μm (available commercially under the name "Martinal OL 104" from Albemarle Corp.) are digested with stirring at 600 rpm for one minute. Following incorporation of the aluminum trihydroxide, 15 g of N-(2-aminoethyl)-3-aminopropyltrimethoxysilane are mixed in for one minute at 200 rpm. Lastly, homogenization takes place for two minutes at 600 rpm and for one minute at 200 rpm under a pressure of 100 mbar, with stirring until the mixture is free of bubbles.

The completed K1 component (K1-C) is dispensed into a container which can be closed in an airtight manner.

Preparation Example 1D

Preparation of a K1 Component for a 2-Component Adhesive Formulation (K1-D)

51.0 g of silane-terminated polypropylene glycol having an average molar mass ($M_e$) of 12,000 daltons and end groups of the formula —O—C(=O)—NH—CH$_2$—SiCH$_3$(OCH$_3$)$_2$ (available commercially under the name GENIOSIL® STP-E10 from Wacker Chemie AG, Munich (DE)) are homogenized for two minutes at 200 rpm in a laboratory planetary mixer from PC-Laborsystem, equipped with two cross-arm mixers, at about 25° C. with 99.0 g of a solvent-free, liquid phenylsilicone resin, which is composed of phenyl-functional T units (60-65 wt %) and methyl-functional T units (18-22 wt %), and dimethyl-functional D units (2-4 wt %), and has a methoxy groups content of 12-16 wt % and an average molar mass of 800-1300 daltons (available commercially under the name SILRES® IC 368 from Wacker Chemie AG, Munich (DE)) and 1.5 g of stabilizer (available commercially under the name TINUVIN® 123 from BASF AG, Germany; CAS NO: 129757-67-1). Thereafter, 141.0 g of aluminum trihydroxide having a BET surface area of 3-5 m$^2$/g and a d50 value of 1.7-2.1 μm (available commercially under the name "Martinal OL 104" from Albemarle Corp.) are digested with stirring at 600 rpm for one minute. Following incorporation of the aluminum trihydroxide, 7.5 g of N-(2-aminoethyl)-3-aminopropyltrimethoxysilane are mixed in at 200 rpm for one minute. Lastly, homogenization takes place for two minutes at 600 rpm and for one minute at 200 rpm under a pressure of 100 mbar, with stirring until the mixture is free of bubbles.

The completed K1 component (K1-D) is dispensed into a container which can be closed in an airtight manner.

Preparation Example 2A

Preparation of a K2 Component for a 2-Component Adhesive Formulation (K2-A)

In 270 g of a solvent-free, liquid phenylsilicone resin, which is composed of phenyl-functional T units (60-65 wt %) and methyl-functional T units (18-22 wt %), and dimethyl-functional D units (2-4 wt %), and has a methoxy groups content of 12-16 wt % and an average molar mass of 800-1300 daltons (available commercially under the name SILRES® IC 368 from Wacker Chemie AG, Munich (DE)), in a laboratory planetary mixer from PC-Laborsystem, equipped with two cross-arm mixers, at about 25° C., 15.0 g of a hydrophilic fumed silica having a BET surface area of about 200 m$^2$/g (available commercially as HDK® N20 from Wacker Chemie AG, Munich (DE)) are digested with stirring at 600 rpm for one minute. Following incorporation of the silica, 15.0 g of water are mixed in at 200 rpm for one minute. Lastly, homogenization takes place for two minutes at 600 rpm and for one minute at 200 rpm under a pressure of 100 mbar, with stirring until the mixture is free of bubbles.

The completed K2 component (K2-A) is dispensed into a container which can be closed in an airtight manner.

Preparation Example 2B

Preparation of a K2 Component for a 2-Component Adhesive Formulation (K2-B)

The procedure is as for preparation example 2A. However, 277.5 g instead of 270.0 g of phenylsilicone resin and only 7.5 g instead of 15.0 g of water, are used.

The completed K2 component (K2-B) is dispensed into a container which can be closed in an airtight manner.

Preparation Example 2C

Preparation of a K2 Component for a 2-Component Adhesive Formulation (K2-C)

The procedure is as for example 2A. However, 282 g instead of 270.0 g of SILRES® IC 368 and only 3.0 g instead of 15.0 g of water, are used.

The completed K2 component (K2-C) is dispensed into a container which can be closed in an airtight manner.

Preparation Example 2D

Preparation of a K2 Component for a 2-Component Adhesive Formulation (K2-D)

In 165 g of a singly branched polypropylene oxide triol having an average molar mass ($M_n$) of 6000 daltons (available commercially under the name Acclaim® 6300 from Bayer Material Science, Leverkusen (DE)), in a laboratory planetary mixer from PC-Laborsystem, equipped with two cross-arm mixers, at about 25° C., 105 g of chalk having a BET surface area of 15 m$^2$/g and a d50 value of 0.45 μm (available commercially under the name "Socal U1S2" from Solvay) are digested with stirring at 600 rpm for one minute.

Thereafter 30.0 g of water are mixed in at 200 rpm for one minute. Lastly, homogenization takes place for two minutes at 600 rpm and for one minute at 200 rpm under a pressure of 100 mbar, with stirring until the mixture is free of bubbles.

The completed K2 component (K2-D) is dispensed into a container which can be closed in an airtight manner.

Example 1

30 g in each case of the completed K1 components K1-A, K1-B, and K1-C from preparation examples 1A to 1C are combined with 30 g in each case of the completed K2 components K2-A, K2-B, and K2-C from preparation examples 2A to 2C, to give the nine two-component curing adhesive systems set out in Table 1. The mixing of the components and the delivery of the completed two-component mixture takes place by a Mixpac™ B system from Sulzer Mixpac AG, Ruetistrasse 7, CH-9469 Haag, Switzerland. The components for mixing are dispensed each into one cartridge part of a 2-component cartridge with a volume of 50 ml per cartridge part and are mixed homogeneously on extrusion from the 2-component cartridge, by the static mixer belonging to the Mixpac™ B system (Order number 0608 4454-14). Subsequently, a determination is made of the properties of the nine resulting two-component crosslinking compositions.

Skin Forming Time (SFT)

For the determination of the skin forming time, the nine resulting two-componently crosslinking compositions are each applied as a layer 2 mm thick to PE film and stored under standard conditions (23° C. and 50% relative atmospheric humidity). In the course of curing, the formation of a skin is tested once a minute. This is done by carefully placing a dry laboratory spatula on the surface of the sample and pulling it upward. If sample sticks to the spatula, a skin has not yet formed. When sample no longer sticks to the spatula, a skin has formed and the time is recorded. The results are found in Table 1.

TABLE 1

| Example | Component K1 | Component K2 | Proportion | Skin forming time [min] |
|---|---|---|---|---|
| 1.1 | K1-A | K2-A | 1:1 | 15 |
| 1.2 | K1-A | K2-B | 1:1 | 18 |
| 1.3 | K1-A | K2-C | 1:1 | 20 |
| 1.4 | K1-B | K2-A | 1:1 | 37 |
| 1.5 | K1-B | K2-B | 1:1 | 60 |
| 1.6 | K1-B | K2-C | 1:1 | 65 |
| 1.7 | K1-C | K2-A | 1:1 | 5 |
| 1.8 | K1-C | K2-B | 1:1 | 9 |
| 1.9 | K1-C | K2-C | 1:1 | 15 |

Tensile Shear Strength

The tensile shear strengths of the nine resulting two-component crosslinking compositions are determined in accordance with DIN EN 204, but with aluminum plaques being bonded. In this case, the adhesive is applied to the two aluminum plaques to be bonded, which are then drawn down using a 100 µm doctor. The two plaques are subsequently joined over an area of 1×2 cm with an applied pressure of 5 kg for one minute. After the application of pressure, the plaques are stored under standard conditions for 150 hours. The tensile shear strength of the two bonded aluminum plaques is then measured.

All nine resulting two-component crosslinking compositions have virtually identical tensile shear strengths, which lie within a range between 8.5 and 9.5 MPa.

Determination of the Development of Tensile Shear Strength:

For the above-described 1:1 mixtures of components K1-B and K2-A and also components K1-C and K2-A, the development of tensile shear strength as a function of the curing time was ascertained.

The tensile shear strengths in this case are determined in accordance with DIN EN 204, but with aluminum plaques being bonded. In this case, the adhesive is applied to the two aluminum plaques to be bonded, which are then drawn down using a 100 µm doctor. The two plaques are subsequently joined over an area of 1×2 cm with an applied pressure of 5 kg for one minute. After the application of pressure, the plaques are stored under standard conditions for the time reported in Table 2. The tensile shear strength of the two bonded aluminum plaques is then measured. The results are found in Table 2.

TABLE 2

| Curing time [h] | Example 1.4 Tensile shear strength of 2-component mixture (K1-B/K2-A) [MPa] | Example 1.7 Tensile shear strength of 2-component mixture (K1-C/K2-A) [MPa] |
|---|---|---|
| 6 | 1.2 | 2.9 |
| 20 | 3.3 | 5.1 |
| 30 | 4.6 | 6.7 |
| 100 | 9.0 | 8.0 |
| 150 | 9.2 | 8.8 |

Example 2

Determination of the Properties of 2-Component Adhesive Formulations 60 g of each of the completed K1 components K1-B and K1-D from preparation examples 1B and 1D are weighed out together with 6 g of each of the completed K2 components K2-D from preparation example 2D, and are mixed homogeneously using a laboratory spatula.

The properties of the two resulting two-component crosslinking compositions are then ascertained.

Skin Forming Time (SFT)

The skin forming time is determined as described in example 1. Here, the 10:1 mixture of components K1-B and K2-D has a skin forming time of 32 minutes, and the 10:1 mixture of components K1-D and K2-D shows a skin forming time of 10 minutes.

Determination of the Development of Tensile Shear Strength:

For the two above-described 10:1 mixtures of components K1-B and K2-D and of K1-D and K2-D, the development of tensile shear strength as a function of the curing time was ascertained.

The development of tensile shear strength is determined as described in example 1. The results are found in Table 3.

TABLE 3

| Curing time [h] | Example 2.1 Tensile shear strength of 2-component mixture (K1-B/K2-D) [MPa] | Example 2.2 Tensile shear strength of 2-component mixture (K1-D/K2-D) [MPa] |
| --- | --- | --- |
| 6 | 2.3 | 2 |
| 20 | 3.1 | 4 |
| 30 | 4.3 | 6.6 |
| 100 | 5 | 7 |
| 150 | 5.2 | 7.2 |

The invention claimed is:

1. A multicomponent crosslinkable composition comprising:
at least a component (K1) and a component (K2),
wherein the component (K1) comprises 100 parts by weight of one or more compounds (A) of the formula $$Y-[(CR^1{}_2)_b-SiR_a(OR^2)_{3-a}]_x \quad (I),$$

where
Y represents an x-valent polymer radical bonded via nitrogen, oxygen, sulfur, or carbon,
R each are identical or different monovalent, optionally substituted, SiC-bonded hydrocarbon radicals,
$R^1$ each are identical or different, and are a hydrogen or a monovalent, optionally substituted hydrocarbon radical, which may be bonded to carbon via nitrogen, phosphorus, oxygen, sulfur, or a carbonyl group,
$R^2$ each are identical or different, and are a hydrogen or a monovalent, optionally substituted hydrocarbon radical,
x is an integer from 1 to 10,
a is identical or different and is 0, 1, or 2, and
b is identical or different and is an integer from 1 to 10,
and
wherein the component (K2) based on 100 parts by weight of compounds (A) in the component (K1), contains at least 0.05 part by weight of water, and at least 1 part by weight of at least one further substance (B) to (F)
(B) one or more silicone resins comprising units of the formula $$R^3{}_c(R^4O)_d SiO_{(4-c-d)/2} \quad (II),$$

where
$R^3$ each are identical or different, and are a hydrogen or a monovalent, SiC-bonded, optionally substituted hydrocarbon radical,
$R^4$ each are identical or different, and are a hydrogen or a monovalent, optionally substituted hydrocarbon radical,
c is 0, 1, 2, or 3, and
d is 0, 1, 2, or 3,
wherein the sum of c+d≤3 and in at least 50% of the units of the formula (II) c is 0 or 1,
(C) one or more plasticizers,
(D) one or more fillers,
(E) one or more thickeners, and
(F) one or more solvents,
with the proviso that in total there are at least 10 parts by weight of silicone resins (B) in components (K1) and (K2), based on 100 parts by weight of compounds (A) in the component (K1).

2. The crosslinkable composition of claim 1, wherein the crosslinkable composition is a two-component composition consisting of components (K1) and (K2).

3. The crosslinkable composition of claim 1, further comprising silicone resins (B) in an amount of 30 to 1000 parts by weight, based on 100 parts by weight of the compounds (A) in the component (K1).

4. The crosslinkable composition of claim 1, wherein the silicon resins (B) are phenylsilicone resins.

5. The crosslinkable composition of claim 1, further comprising one or more organosilicon compounds (G) comprising units of the formula $$D_g Si(OR^5)_f R^6{}_e O_{(4-e-f-g)/2} \quad (VI)$$

wherein
$R^5$ each are identical or different, and are a hydrogen or optionally substituted hydrocarbon radicals,
D each are identical or different monovalent, SiC-bonded radicals containing basic nitrogen,
$R^6$ each are identical or different monovalent, optionally substituted, SiC-bonded organic radicals free from basic nitrogen,
e is 0, 1, 2, or 3,
f is 0, 1, 2, or 3, and
g is 0, 1, 2, 3, or 4,
with the proviso that the sum of e+f+g≤4 and at least one radical D is present per molecule.

6. The crosslinkable composition of claim 1, wherein the crosslinkable composition consists of the component (K1) comprising:
(A) 100 parts by weight of compounds of the formula (I),
optionally
(B) a silicone resin comprising units of the formula (II),
optionally
(C) one or more plasticizers,
optionally
(D) one or more fillers,
optionally
(F) one or more solvents,
optionally
(G) one or more compounds containing basic nitrogen,
optionally
(H) one or more catalysts,
optionally
(I) one or more adhesion promoters,
optionally
(J) one or more water scavengers,
optionally
(L) one or more additives, and
optionally
(M) one or more adjuvants, and
the component (K2) is based in each case on 100 parts by weight of compounds (A), at least 0.05 part by weight of water, and at least 1 part by weight of at least one substance selected from the group consisting of
(B) one or more silicone resins comprising units of the formula (II),
(C) one or more plasticizers,
(D) one or more fillers,
(E) one or more thickeners,
(F) one or more solvents,
optionally
(H) one or more catalysts,
optionally
(L) one or more additives, and
optionally
(M) one or more adjuvants,
with the proviso that the crosslinkable composition contains in total at least 10 parts by weight of silicone resins (B).

7. A method for producing a multicomponent crosslinkable composition comprising:
mixing together constituents of a component (K1) comprising 100 parts by weight of one or more compounds (A) of the formula

$$Y\text{—}[(CR^1{}_2)_b\text{—}SiR_a(OR^2)_{3-a}]_x \quad (I),$$

where
Y represents an x-valent polymer radical bonded via nitrogen, oxygen, sulfur, or carbon,
R each are identical or different monovalent, optionally substituted, SiC-bonded hydrocarbon radical,
$R^1$ each are identical or different, and are a hydrogen or a monovalent, optionally substituted hydrocarbon radical; which is bonded to carbon via nitrogen, phosphorus, oxygen, sulfur, or carbonyl group,
$R^2$ each are identical or different, and are a hydrogen or a monovalent, optionally substituted hydrocarbon radical,
x is an integer from 1 to 10,
a is identical or different and is 0, 1, or 2, and
b is identical or different and is an integer from 1 to 10;
wherein the constituents are mixed in any order; and
mixing together constituents of a component (K2) based on 100 parts by weight of compounds (A) in the component (K1), contains at least 0.05 part by weight of water, and at least 1 part by weight of at least one further substance (B) to (F)
(B) one or more silicone resins comprising units of the formula

$$R^3{}_c(R^4O)_d SiO_{(4-c-d)/2} \quad (II),$$

where
$R^3$ each are identical or different, and are a hydrogen or a monovalent, SiC-bonded, optionally substituted hydrocarbon radical,
$R^4$ each are identical or different, and are a hydrogen or a monovalent, optionally substituted hydrocarbon radical,
c is 0, 1, 2, or 3, and
d is 0, 1, 2, or 3,
wherein the sum of c+d ≤3 and in at least 50% of the units of the formula (II) c is 0 or 1,
(C) one or more plasticizers,
(D) one or more fillers,
(E) one or more thickeners, and
(F) one or more solvents,
with the proviso that in total there are at least 10 parts by weight of silicone resins (B) in components (K1) and (K2), based on 100 parts by weight of compounds (A) in the component (K1),
wherein the constituents are mixed in any order; and
mixing together the component (K1), the component (K2), and optionally further components.

8. The method of claim 7, further comprising adhesive bonding or sealing of substrates by following steps:
applying a mixture of the component (K1), the component (K2), and optionally further components to a surface of at least one substrate,
subsequently contacting the surface with a second substrate to be bonded, and
subsequently allowing crosslinking of the multicomponent crosslinkable composition.

9. The method of claim 7, further comprising producing coatings or encapsulations by following steps:
applying a mixture of the component (K1), the component (K2), and optionally further components to a surface of at least one substrate, and
subsequently allowing crosslinking of the multicomponent crosslinkable composition composition.

10. A shaped article produced by crosslinking a multicomponent crosslinkable composition comprising:
at least a component (K1) and a component (K2),
wherein the component (K1) comprises 100 parts by weight of one or more compounds (A) of the formula

$$Y\text{—}[(CR^1{}_2)_b\text{—}SiR_a(OR^2)_{3-a}]_x \quad (I),$$

where
Y represents an x-valent polymer radical bonded via nitrogen, oxygen, sulfur, or carbon,
R each are identical or different monovalent, optionally substituted, SiC-bonded hydrocarbon radicals,
$R^1$ each are identical or different, and are a hydrogen or a monovalent, optionally substituted hydrocarbon radical, which is bonded to carbon via nitrogen, phosphorus, oxygen, sulfur, or carbonyl group,
$R^2$ each are identical or different, and are a hydrogen or a monovalent, optionally substituted hydrocarbon radical,
x is an integer from 1 to 10,
a is identical or different and is 0, 1, or 2, and
b is identical or different and is an integer from 1 to 10, and
wherein the component (K2), based on 100 parts by weight of compounds (A) in the component (K1), contains at least 0.05 part by weight of water, and at least 1 part by weight of at least one further substance selected from the group consisting of
(B) one or more silicone resins comprising units of the formula

$$R^3{}_c(R^4O)_d SiO_{(4-c-d)/2} \quad (II),$$

where
$R^3$ each are identical or different, and are a hydrogen or a monovalent, SiC-bonded, optionally substituted hydrocarbon radical,
$R^4$ each are identical or different, and are a hydrogen or a monovalent, optionally substituted hydrocarbon radical,
c is 0, 1, 2, or 3, and
d is 0, 1, 2, or 3,
wherein the sum of c+d ≤3 and in at least 50% of the units of the formula (II) c is 0 or 1,
(C) one or more plasticizers,
(D) one or more fillers,
(E) one or more thickeners, and
(F) one or more solvents,
with the proviso that in total there are at least 10 parts by weight of silicone resins (B) in components (K1) and (K2), based on 100 parts by weight of compounds (A) in the component (K1).

11. The multicomponent crosslinkable composition of claim 1, wherein the silicone resin (B) has a number average molecular weight $M_n$ of ≥400 g/mol.

12. The multicomponent crosslinkable composition of claim 1, wherein the silicone resins (B) comprise one or more (Q) units of the formulae $SiO_{4/2}$, $Si(OR^4)O_{3/2}$, $Si(OR^4)_2 O_{2/2}$, and $Si(OR^4)_3 O_{1/2}$, and/or (T) units of the formulae $PhSiO_{3/2}$, $PhSi(OR^4)O_{2/2}$, and $PhSi(OR^4)_2 O_{1/2}$, optionally (D) units of the formulae $Me_2SiO_{2/2}$ and $Me_2Si(OR^4)O_{1/2}$, and optionally (M) units of the formula $Me_3SiO_{1/2}$, where Me is the methyl radical, Ph is the phenyl radical, and $R^4$ is the methyl, ethyl, or butyl radical.

13. The multicomponent crosslinkable composition of claim 12, wherein the silicone resin (B) comprises (T) units, and 0-2 mol of (Q) units, 0-2 mol of (D) units, and 0-2 mol of (M) units, per mol of (T) units.

14. The multicomponent crosslinkable composition of claim 1, wherein the silicone resins (B) comprise one or more T units of the formulae $PhSiO_{3/2}$, $PhSi(OR^4)O_{2/2}$, and $PhSi(OR^4)_2O_{1/2}$, T units of the formulae $MeSiO_{3/2}$, $MeSi(OR^4)O_{2/2}$, and $MeSi(OR^4)_2O_{1/2}$, and optionally, one or more D units of the founulae $Me_2SiO_{2/2}$ and $Me_2Si(OR^4)O_{1/2}$, where Me is the methyl radical, Ph is the phenyl radical, and $R^4$ is the methyl, ethyl, or butyl radical.

15. The multicomponent crosslinkable composition of claim 14, wherein the molar ratio of phenylsilicone units to methylsilicone units is between 0.5 to 2.0.

16. The multicomponent crosslinkable composition of claim 14, wherein the amount of D units is below 10 wt. % based on the total weight of the silicone resin.

17. The multicomponent crosslinkable composition of claim 1, wherein the silicone resins (B) comprise one or more T units of the formulae $PhSiO_{3/2}$, $PhSi(OR^4)O_{2/2}$, and $PhSi(OR^4)_2O_{1/2}$, where Ph is the phenyl radical and $R^4$ is the methyl, ethyl, or butyl radical.

18. The multicomponent crosslinkable composition of claim 1, wherein the silicone resins (B) consists essentially of one or more (Q) units of the formulae $SiO_{4/2}$, $Si(OR^4)O_{3/2}$, $Si(OR^4)_2O_{2/2}$, and $Si(OR^4)_3O_{1/2}$, and/or one or more (T) units of the formulae $PhSiO_{3/2}$, $PhSi(OR^4)O_{2/2}$, and $PhSi(OR^4)_2O_{1/2}$, optionally one or more (D) units of the formulae $Me_2SiO_{2/2}$ and $Me_2Si(OR^4)O_{1/2}$, and (M) units of the formula $Me_3SiO_{1/2}$, where Me is the methyl radical, Ph is the phenyl radical, and $R^4$ is the methyl, ethyl, or butyl radical.

19. The multicomponent crosslinkable composition of claim 1, wherein the silicone resins (B) consists essentially of one or more T units of the formulae $PhSiO_{3/2}$, $PhSi(OR^4)O_{2/2}$, and $PhSi(OR^4)_2O_{1/2}$, T units of the formulae $MeSiO_{3/2}$, $MeSi(OR^4)O_{2/2}$, and $McSi(OR^4)_2O_{1/2}$, and optionally, D units of the formulae $Me_2SiO_{2/2}$ and $Me_2Si(OR^4)O_{1/2}$, where Me is the methyl radical, Ph is the phenyl radical, and $R^4$ is the methyl, ethyl, or butyl radical.

20. The multicomponent crosslinkable composition of claim 1, wherein the silicone resins (B) consists essentially of one or more T units of the formulae $PhSiO_{3/2}$, $PhSi(OR^4)O_{2/2}$, and $PhSi(OR^4)_2O_{1/2}$, where Ph is the phenyl radical and $R^4$ is the methyl, ethyl, or butyl radical.

* * * * *